United States Patent
Xu et al.

(10) Patent No.: US 8,090,342 B2
(45) Date of Patent: Jan. 3, 2012

(54) EMERGENCY ALERT SERVICE FOR INACTIVE MOBILE STATIONS IN A COMMUNICATION SYSTEM

(75) Inventors: Xiang Xu, Nanjing (CN); Shahab M. Sayeedi, Naperville, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 338 days.

(21) Appl. No.: 12/540,393

(22) Filed: Aug. 13, 2009

(65) Prior Publication Data
US 2010/0105351 A1    Apr. 29, 2010

Related U.S. Application Data

(60) Provisional application No. 61/108,647, filed on Oct. 27, 2008.

(51) Int. Cl.
*H04M 11/04* (2006.01)
*H04B 7/00* (2006.01)
(52) U.S. Cl. ............. 455/404.1; 455/404.2; 455/515
(58) Field of Classification Search ........ 455/404.1, 455/404.2, 515
See application file for complete search history.

(56) References Cited

U.S. PATENT DOCUMENTS

| | | | |
|---|---|---|---|
| 7,574,194 B2 | 8/2009 | Yang et al. | |
| 7,676,215 B2 | 3/2010 | Chin et al. | |
| 2003/0162557 A1* | 8/2003 | Shida | 455/521 |
| 2007/0202871 A1* | 8/2007 | Altshuller et al. | 455/428 |
| 2008/0205308 A1* | 8/2008 | Prehofer et al. | 370/310 |
| 2008/0261554 A1* | 10/2008 | Keller et al. | 455/404.1 |
| 2009/0130972 A1* | 5/2009 | Andersen et al. | 455/3.01 |
| 2009/0186595 A1* | 7/2009 | Son et al. | 455/404.1 |
| 2011/0171923 A1* | 7/2011 | Daly et al. | 455/404.1 |

FOREIGN PATENT DOCUMENTS

| | | |
|---|---|---|
| KR | 10-2003-0075938 A | 9/2003 |
| KR | 10-2004-0034410 A | 4/2004 |
| KR | 10-2005-0024998 A | 3/2005 |
| KR | 10-2005-0093306 A | 9/2005 |
| KR | 10-0586413 B1 | 6/2006 |
| KR | 10-0842548 B1 | 7/2008 |
| WO | WO 2002-027958 A2 | 4/2002 |

OTHER PUBLICATIONS

WiMAX Forum Network Working Group, "WiMAX Network Protocols and Architecture for Multi-cast and Broad-cast Services", Part of Network Release 1.5, NWG_MCBCS_Stage-2_Baseline.doc, ZTE, 2007 WiMAX Forum, MCBCS Stage-2 Specification, all pages.

Fenner, W.: "Internet Group Management Protocol, Version 2", Request for Comments: 2236, Xerox PARC, Updates: 1112, Nov. 1997, all pages.

(Continued)

*Primary Examiner* — Ariel Balaoing

(57) ABSTRACT

An apparatus and method for sending emergency alert information to inactive mobile stations in a wireless communication system includes a step of receiving 802, by a radio access network, emergency alert information for mobile stations. A next step includes determining 803 wake-up periods for at least two inactive mobile stations. A next step includes sending 805 a message to each of the at least two mobile stations, during the wake-up periods for each of the at least two each inactive mobile station, that includes instructions to wake up in a common emergency alert listening frame. A next step includes conveying 806 emergency alert instructions in the common emergency listening frame to the mobile stations.

3 Claims, 13 Drawing Sheets

OTHER PUBLICATIONS

Kddi, Samsung, Hitachi, Mitsubishi et al.: "MCBCS over M-WiMAX (Application layer signaling approach vs Procedure based on DSx approach)", Aug. 6, 2008, all pages.

Albert Gu, Limei Wang: MCBCS Architecture, Huawei, WiMAX Forum, Feb. 26, 2008, all pages.

Commercial Mobile Alert Service Architecture and Requirements, Draft—Version 0.6, Sep. 24, 2007, Revision Date, Sep. 24, 2007, all pages.

Part 16: Air Interface for Broadband Wireless Access Systems, P802.16/Rev2/D9 Jan. 2009, IEEE WirelessMAN 802.16, pp. 793-794.

In Gu Sung, "Corresponding Application PCT/US2009/059485—PCT International Search Report and Written Opinion," WIPO, ISA/KR, Korean Intellectual Property Office, Daejeon, Republic of Korea, Apr. 28, 2010, 10 pages, most relevant pp. 6-7 and 10.

* cited by examiner

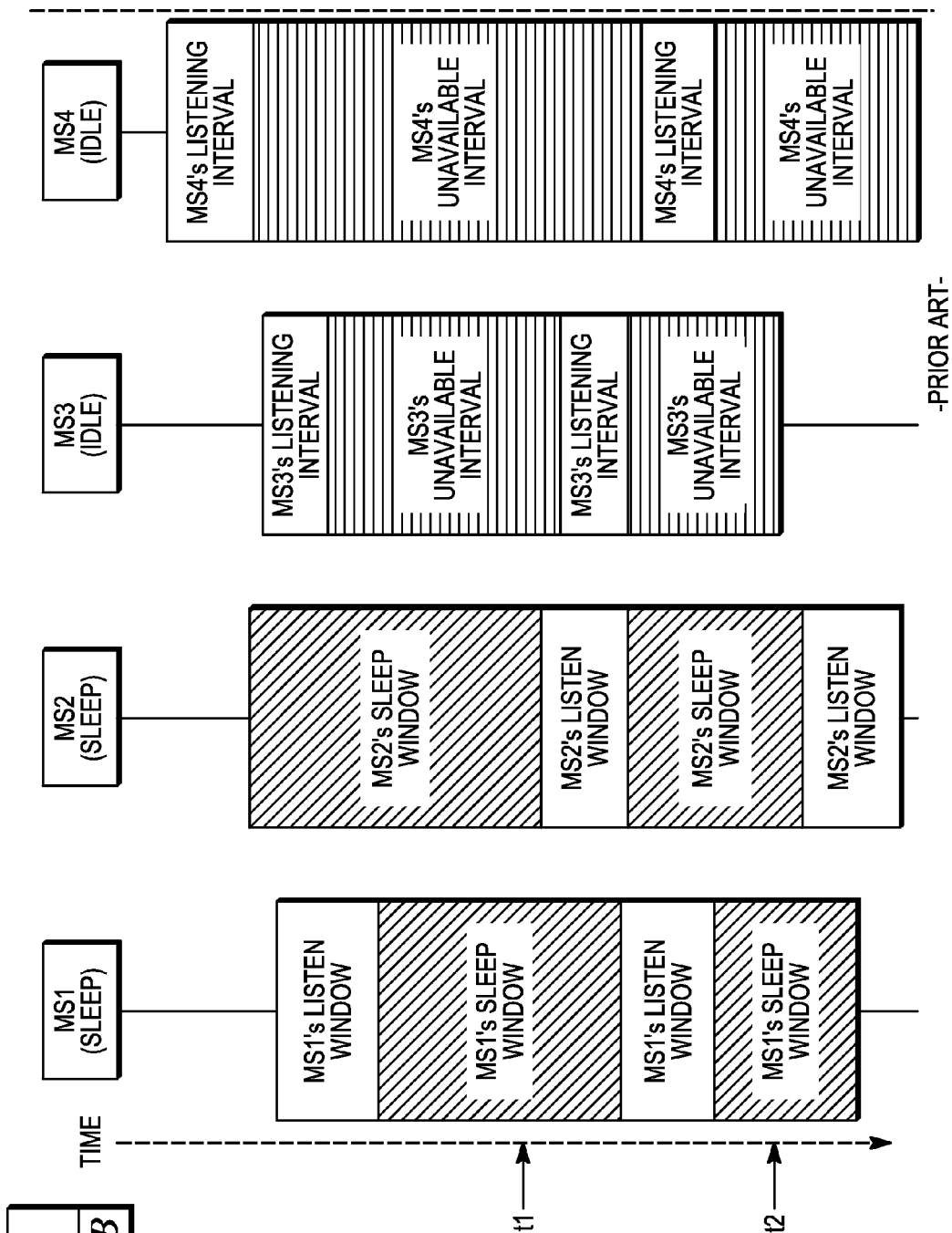

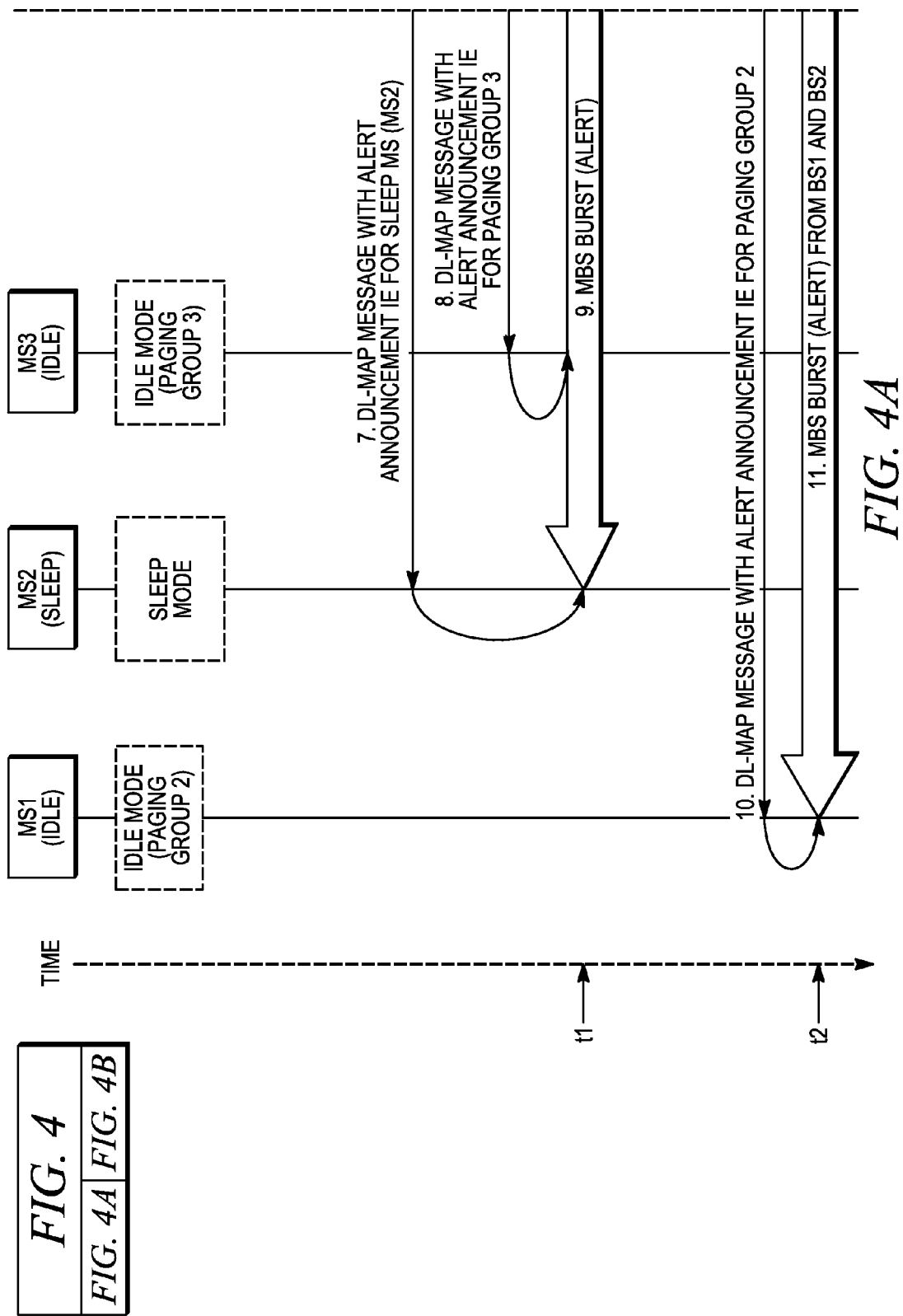

| SYNTAX | SIZE (BIT) | NOTES |
|---|---|---|
| ALERT_ANNOUNCEMENT_IE() { | — | — |
| EXTENDED DIUC | 4 | ALERT_ANNOUNCEMENT_IE() = 0x0x |
| LENGTH | 4 | LENGTH IN BYTES |
| EAS INDICATION | 8 | BIT #0-4: CLASS OF ALERT MESSAGE. WHEN THE BIT IS SET TO 1, IT INDICATES THE TYPE OF ALERT TO BE TRANSMITTED IN THE FRAME POINTED BY EAS_TRANSMISSION_FRAME<br>BIT#0: PRESIDENTIAL ALERT<br>BIT#1: EXTREME THREAT<br>BIT#2: SEVERE THREAT<br>BIT#3: AMBER ALERT<br>BIT#4: EAS TEST<br>BIT #5-7: COMBINATION VALUE OF URGENCY/SEVERITY/CERTAINTY |
| NUMBER OF REMAINING RETRANSMISSIONS | 8 | INDICATES THE NUMBER OF REMAINING RETRANSMISSIONS |
| EAS_TRANSMISSION_FRAME | 8 | THE LEAST SIGNIFICANT BITS OF THE FRAME NUMBER OF THE NEXT EAS TRANSMISSION |
| } | — | |

*FIG. 6*

| TYPE | LENGTH | VALUE | SCOPE |
|---|---|---|---|
| [145/146].XX | 1 | BIT #0-4: INDICATES THE CLASS OF UN-SCHEDULED ALERT. WHEN THE BIT IS SET TO 1, IT INDICATES THE TYPE OF ALERT TO BE TRANSMITTED IN THIS SERVICE FLOW<br>BIT#0: PRESIDENTIAL ALERT<br>BIT#1: EXTREME THREAT ALERT<br>BIT#2: SEVERE THREAT ALERT<br>BIT#3: AMBER ALERT<br>BIT#4: EAS TEST | DSA-REQ, DSA-RSP, DSC-REQ, DSC-RSP |

*FIG. 9*

EMERGENCY ALERT SERVICE FOR INACTIVE MOBILE STATIONS IN A COMMUNICATION SYSTEM

FIELD OF THE INVENTION

This invention relates to wireless communication systems, and in particular, to supporting emergency alerts in a communication system.

BACKGROUND OF THE INVENTION

An Emergency Alert Service (EAS) that is provided over a wireless system, such as an IEEE 802.16 Rev D7 based networks (e.g. WiMAX), is becoming a regulatory requirement in many countries. In the US, the Federal Communications Commission (FCC) has issued rules for Commercial Mobile Alert Service (CMAS) in April 2008. In Japan, there is a request to deliver first emergency warning "Primary Notification" to a mobile station (MS) within four seconds. In Europe, a "Communication from Authority to individuals and the public during emergencies" is used, as it includes not only the warning service. Similarly, 3GPP and 3GPP2 are developing a Public Warning System (PWS) specification to use Cell Broadcast Short Messaging Service (SMS) to deliver a Textual Emergency Alert. In all of these cases, emergency information (from authorized sources) has to be sent only to all users in a given area. No subscription is necessary, and inbound roaming users also need to be supported.

IEEE 802.16 specifies three modes of service for a mobile: a) active mode, during which the MS and base station (BS) perform normal operations to exchange downlink and uplink (DL/UL) traffic, b) sleep mode, during which the MS conducts pre-negotiated periods of absence from the serving BS air interface. In this case, the MS and BS do not exchange DL/UL traffic during a sleep window, but the MS still retains all service flows. The mobile station includes a receiver that it only turns on at pre-determined period, i.e. wake-up period, for broadcast/multicast message, and unicast message, and c) idle mode, during which the MS becomes periodically available for DL broadcast traffic messaging without registration at a specific BS as the MS traverses an air link environment populated by multiple BSs, typically over a large geographic area. In this case, the MS only retains service flow for multicast-broadcast service, and all other service flows are deleted. In this mode, the mobile station only turns on its receiver at pre-determined period, i.e. wake-up period, for broadcast/multicast message. However, the current IEEE 802.16 Rev2 D7 air interface specification and WiMAX Forum Network Working Group (WMF NWG) R1.0 network specification do not specify an EAS solution to convey un-scheduled EAS notification, especially for mobiles that are in idle or sleep mode (collectively referred to herein as "inactive" mode), which only turn on its receiver at pre-determined wake-up period for broadcast/multicast message. Nor do these specifications include a method for the mobile station to be notified regarding which flows have been allocated for EAS support.

One solution for 3GPP and 3GPP2 is to use cell broadcast SMS for EAS, where the cell broadcast SMS may be repeatedly transmitted at pre-defined intervals, so the MS has a reasonably high probability of eventually receiving it. However this solution cannot be used for IEEE 802.16 based networks because the 802.16 air interface doesn't provide a solution for a SMS cell broadcast. Even if this functionality were supported by IEEE 802.16, an MS in inactive mode still cannot receive an SMS broadcast until it is transmitted in the mobile station's wake-up period, assuming the network constantly broadcasts the SMS.

Another solution is to force MSs in inactive mode to switch to active mode so that they can receive EAS. However, this solution results in excessive signaling in the network due to all of the inactive MSs which will need to go active, and this could overwhelm network resources.

Accordingly, what is needed is a technique to provide a WiMAX air interface and network signaling procedures for WiMAX systems to convey emergency alerts to MSs in inactive mode whose users may be impacted by an impending emergency. It would also be of benefit for the EAS to have priority over other wireless services such as Multicast Broadcast Services (MBS) and all other wireless services. It would also be advantageous for a user to have the ability to selectively receive alerts based on a priority level of the alert.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 6 shows a table of an Information Element portion of an Alert Announcement, in accordance with the present invention;

FIG. 9 shows a table of parameters for service flow creation/modification for Emergency Alert Service, in accordance with the present invention.

Skilled artisans will appreciate that common but well-understood elements that are useful or necessary in a commercially feasible embodiment are typically not depicted or described in order to facilitate a less obstructed view of these various embodiments of the present invention.

DESCRIPTION OF THE PREFERRED EMBODIMENTS

The present invention provides an air interface and signaling procedures to send Emergency Alert Service (EAS) message to MSs in idle mode or sleep mode (i.e. inactive mode) whose users may be impacted by an impending emergency. The present invention also allows the EAS to have priority over Multicast Broadcast Services (MBS) and all other wireless services. The present invention also allows a user to have the ability to selectively receive alerts based on a priority level of the alert.

Figure 1:
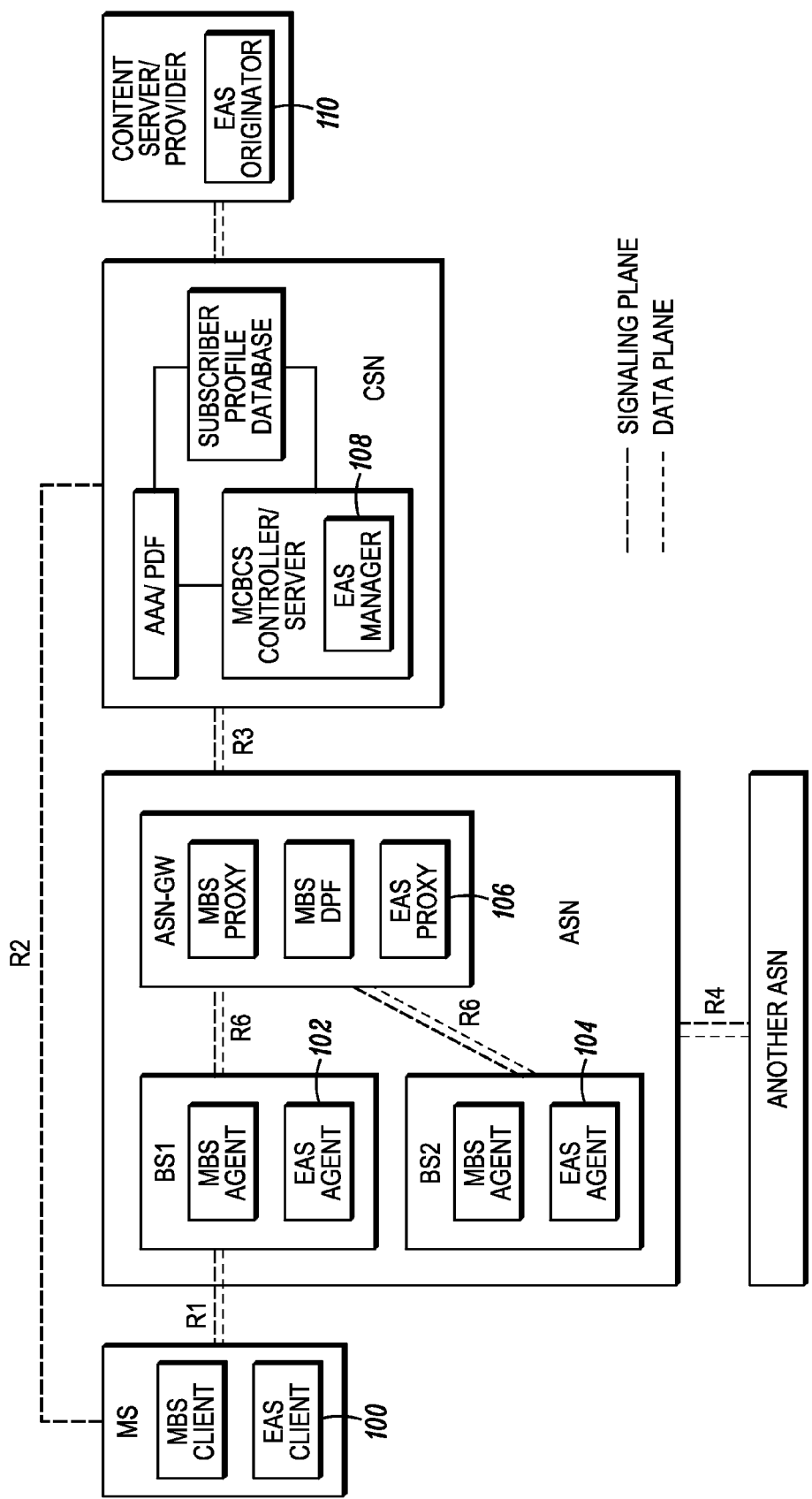
FIG. 1 shows a block diagram of an EAS system architecture, in accordance with the present invention.

FIG. 1 shows an Emergency Alert Service (EAS) architecture embodiment of the present invention. It should be noted that this embodiment is only illustrative of the present invention and that many other embodiments are envisioned, MBS or otherwise. MBS mechanisms are currently being specified by the IEEE and the WiMAX forum. MBS functionality provides the capability to transmit the same content, e.g. a television broadcast, to multiple users at the same time. So a solution based on MBS is a good candidate for supporting EAS in WiMAX networks. However, the current MBS mechanisms suffer from several drawbacks.

Firstly, in MBS a subscription has been required. This requirement doesn't adequately support EAS since not all MSs have an MBS subscription and therefore will be unaware of the broadcast start time, connection information, etc., and therefore will never send an Internet Group Management Protocol (IGMP) join message (here, the join message means Join Group message in RFC 2236 for IGMP IPv4) to receive scheduled emergency alert information if specified in an MBS program guide.

Secondly, due to the nature of EAS, high priority EAS alerts cannot be scheduled in the MBS program guide. EAS is an unscheduled event that can occur at any time, so an MS cannot use the MBS service guide information to receive timely high priority EAS scheduling information. Therefore, an MS in inactive mode will not know when to wake up to receive an EAS as they would with a scheduled multicast.

Figure 2B:
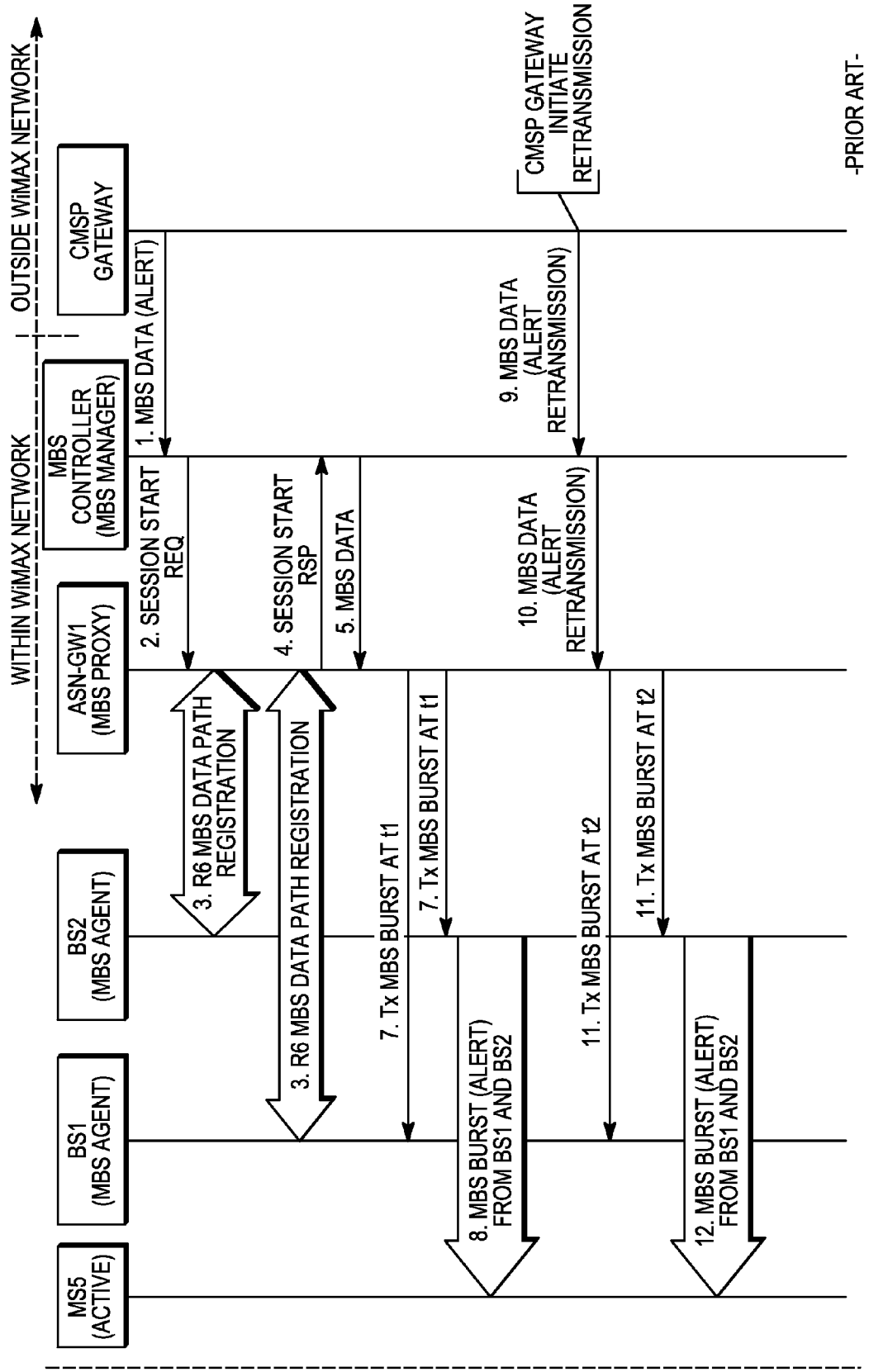
FIG. 2 shows a flow diagram of a prior art CMSP Gateway-initiated retransmission.

Thirdly, an MBS re-transmission from a Commercial Mobile Service Provider (CMSP) Gateway doesn't work for EAS, as shown in FIG. 2 for the scenario where macro-diversity is enabled. Macro-diversity is highly recommended for MBS due to its performance improvement. In FIG. 2, MS1 and MS2 are in sleep mode. MS3 and MS4 are in idle mode. MS5 is in active mode. All of the mobiles except MS5 fail to receive the EAS, even though it was sent twice by the CMSP Gateway and transmitted twice by BS1 and BS2 with macro-diversity enabled. This is because the Access Service Network Gateway (ASN-GW) determines the exact transmission time over the air interface (in the case where macro-diversity is enabled), but doesn't take into account the fact only active mode mobiles will receive the EAS alert when it schedules the transmission; while mobiles in idle or sleep mode will not receive the EAS alert since the current MBS proposals do not require the ASN-GW to know whether MS is active, or in inactive mode when ASN-GW schedules the MBS transmission. Furthermore, the ASN-GW is unaware of MSs that are in sleep mode. Only the BS is aware of mobiles in sleep mode. In the current MBS proposal, it is the responsibility of the MS to wake-up during inactive mode based on the starting time from the service guide.

Referring back to FIG. 1, the present invention proposes an enhanced MBS procedure and WiMAX network architecture to support EAS for MSs in inactive mode. The present invention also proposes changes to 802.16 air interface signaling, and new network signaling procedures to support the call flows to support EAS. As shown, the Content Server/Provider can represent many different entities including federal, state, and local emergency agencies, an alert aggregator for these agencies, an alert gateway, and a CMSP gateway, as are known in the art.

The boxes 100-110 labeled EAS indicate the new functional EAS network entities proposed by the present invention. The following network architecture entities are proposed as an example:

An EAS Manager 108 function can be located in the Connectivity Service Network (CSN) or co-located with the MultiCast and BroadCast Server (MCBCS). Alternatively, the EAS Manager function could be a new server or functional entity located within the CSN. The EAS Manager 108 requires bearer path setup for further emergency alert deliveries. The EAS Manager 108 can prioritize the bearer paths in order to deliver emergency alerts with higher priority. The EAS Manager 108 can also determine the retransmission strategy based on the alert type, network load, operator policy, etc., as a first option.

An EAS proxy 106 function can be located in the ASN-GW or co-located with the MBS proxy. The EAS proxy 106 delivers all active paging group information from the paging controller to an EAS agent function 102, 104. The EAS proxy 106 can also determine the number of retransmissions based on a base station's recommendations, alert type, network load, operator policy, etc., as a second option.

An EAS agent function 102, 104 can be located in a base station or co-located with an MBS agent. The EAS agent 102, 104 buffers the Emergency Alert for retransmission. The EAS agent 102, 104 can also request retransmission if not all of the MSs receive the Emergency Alert. The EAS agent 102, 104 can also flush the buffered Emergency Alert once all retransmissions are complete. The EAS agent 102, 104 generates and transmits an Alert Announcement information element that points to a future frame where the alert is actually transmitted over the air for each of the paging groups and inactive MS.

An EAS Client function 100 is located in the MS. The EAS Client function 100 receives the EAS notification in the common listening frame, i.e. EAS frame pointed to by the pointer in the Alert Announcement, and renders the emergency alert to the end user.

The EAS notification to the MS requires sending an Alert Announcement to the MS. The Alert Announcement may include EAS information such as the reason for the alert and other timely information in addition to instructions for the user. In order to be able to send the EAS notification to MSs in inactive mode, the network must be able to send the Alert Announcements to each inactive MS at a time when the MS will be listening before the actual EAS notification is sent over the air. Rather than sending the EAS notification during the wake-up period for each MS which results in excessive over the air traffic, the network coordinates several inactive mode MSs such that they all wake up and monitor a common listening frame which they wouldn't normally monitor. This is achieved by organizing inactive MSs into EAS group(s), then sending an Alert Announcement over the EAS group thereby notifying all MSs within the group when to wake up again in a future common EAS frame to receive the EAS notification. For example, each MS may belong to two different paging groups, or one MS may be in idle mode and one MS in sleep mode, or both MSs in sleep mode. But if they receive the EAS during the same common listening frame either the first time or during a subsequent retransmission of the frame, they belong to the same EAS group. Other mobiles receiving the EAS alert notification in a different common listening frame (t2 in the figures) will belong to a different ESA group. In this way, an EAS group can contain MSs from multiple paging groups, and MSs in sleep mode, whose wake-up period occurs prior to a common listening frame. The network then transmits the EAS notification during this common listening frame and maximizes the number of inactive mobiles receiving the EAS notification while minimizing EAS traffic over the air.

Figure 3:
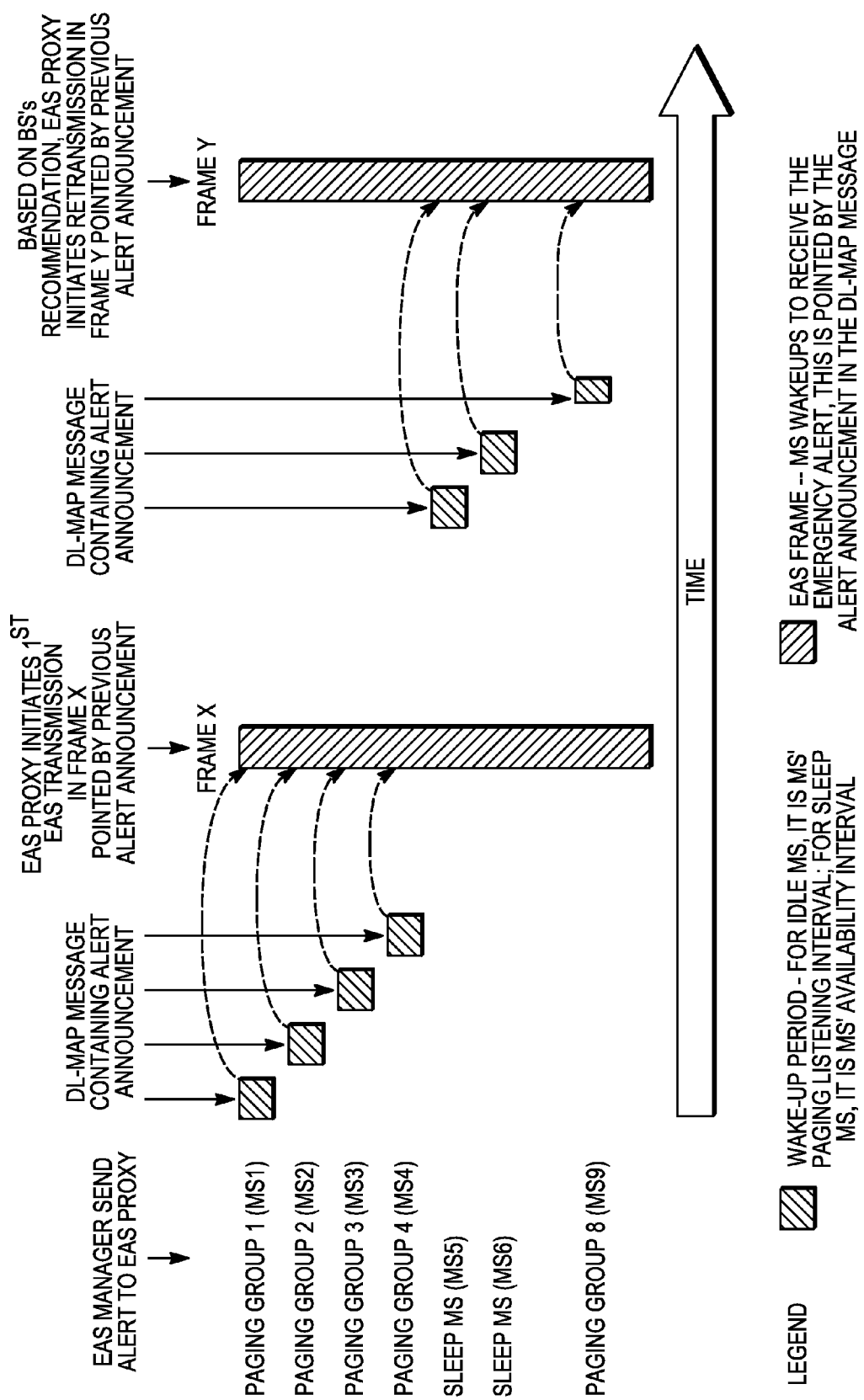
FIG. 3 shows a WiMAX network initiated retransmission, in accordance with the present invention.

Referring to FIG. 3, in order to ensure that all inactive MSs receive EAS notification, the present invention provides an air interface enhancement for an MBS retransmission mechanism initiated by the WiMAX network to the MS to ensure that MSs in inactive mode can successfully receive the EAS notification. Each EAS notification may be transmitted multiple times specifying common listening frames for several groups of paging groups and/or sleeping MSs, as illustrate in FIG. 3. In the example shown, the EAS Proxy in the ASN-GW knows when MSs belong to idle paging groups (1-4) will wake-up to check for broadcast messages. In this case, the MSs belong to these paging groups wake-up at different times. To save on the overhead needed to separately alert each inactive MS, the EAS proxy sends a DL MAP message with Alert Announcement information element at each paging group's wake-up period. The Alert Announcement information element in DL MAP message includes an EAS pointer, that points to a common listening frame x, where that actual EAS message will be broadcast to all inactive MSs belong to these paging groups at the same time, thereby saving messaging overhead. If the EAS Agent knows that sleeping MSs will wake up before frame x, EAS agent could also send a DL-MAP message with Alert Announcement to those sleeping MSs at their wake-up period. The Alert Announcement information element in DL MAP message includes an EAS pointer that points to a common listening frame x, where that actual EAS message will be broadcast to all paging groups at the same time, thereby saving messaging overhead. However, if the inactive MSs will not wake up within a sufficient time period, as shown, then a separate DL MAP message can be sent to these inactive MSs when they wake up later. This separate DL MAP message will point to a later common listening frame y that will include the actual EAS notification.

The EAS Proxy 106 or EAS Manager 108 determines the number of retransmissions based on type of alert, network load, operator policy, recommendation from EAS agent, etc. Each EAS notification can be retransmitted a number of specified times to the same inactive MSs in order to ensure that the EAS is successfully received. The number of EAS notification retransmissions is specified by the EAS Manager 108. A further enhancement to the air interface allows for the number of retransmissions for a current alert be specified in an Alert Announcement in the downlink DL MAP message. For example, if the EAS notification will be transmitted four times, the first Alert Announcement in DL-MAP message sent to inactive MSs will indicate three re-transmissions to follow. A subsequent Alert Announcement in DL-MAP message sent after the EAS transmission will indicate two, one, and zero. An MS receiving the first EAS transmission properly will ignore the next three EAS retransmissions to minimize battery usage. An MS receiving the second Alert Announcement indicating two more re-transmissions will receive the second EAS alert and then ignore the next two as indicated in subsequent Alert Announcement during the wake-up period. This is described further in the call flow procedures described below.

FIG. 9 shows a table of EAS class parameter to indicate the service flow for EAS during service flow creation/modification procedure in accordance with the present invention. An 8-bit parameter is added in DSA-REQ, DSA-RSP, DSC-REQ and DSC-RSP to indicate the type of EAS associated with this service flow. Bit #0-4 describes the class of alert message. For example, if bit #0 is set to 1, it indicates that Presidential Alert will be transmitted using this service flow. If bit #1 is set to 1, it indicates that Extreme Threat alert will be transmitted using this service flow. If bit #2 is set to 1, it indicates that Severe Threat alert will be transmitted using this service flow. If bit #3 is set to 1, it indicates that Amber alert will be transmitted using this service flow. If bit #4 is set to 1, it indicates that EAS test will be transmitted using this service flow.

Figure 10:
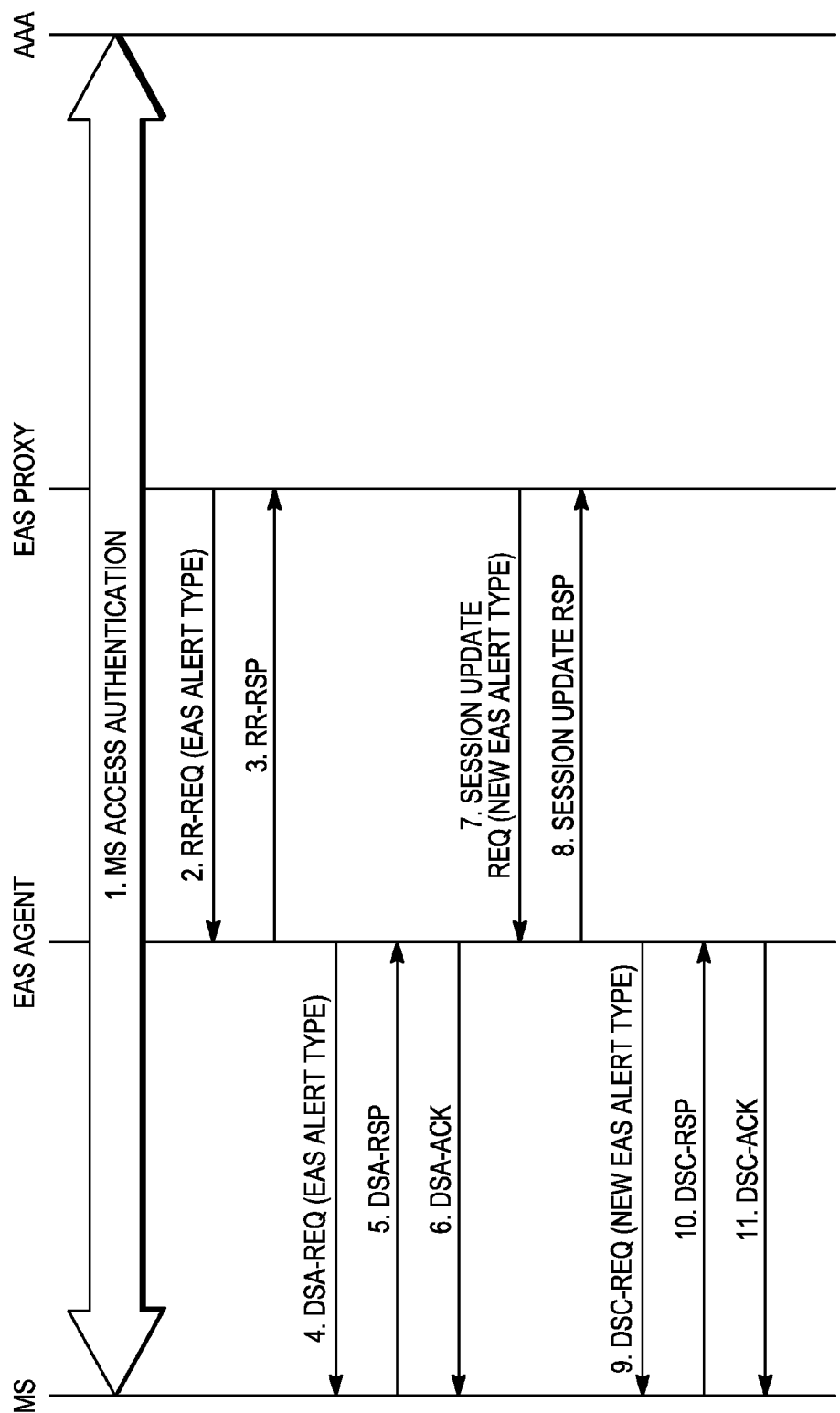
FIG. 10 shows a call flow for service flow creation/modification for Emergency Alert Service, in accordance with the present invention.

As shown in FIG. 10, the present invention also proposes enhancements for connection creation/modification for Emergency Alert Service. Operator may use dedicated connection to convey a specific type of EAS alert, for example, operator may use one connection to carry a Presidential Alert, and another connection to carry an Amber Alert. By using this strategy, it allows MS to selective decode the EAS alert when the user has enabled Opt-out capability. FIG. 10 is a call flow that show the air interface and network signaling proposed by the present invention to establish/modify the connection to convey EAS.

In Step 1, MS performs access authentication.

In Step 2, EAS Proxy initiates bearer path creation for EAS by sending RR-REQ message to EAS Agent. The message contains the type of EAS alert, which will be sent via the established bearer path.

In Step 3, EAS Agent responds EAS Proxy with RR-RSP message. Since the established bearer path is for all MSs, Step 2 and Step 3 can be performed at any time irrespective of the MS' access authentication.

In Step 4, EAS Agent sends DSA-REQ message which includes the EAS Alert Type. This is the type of alerts that will be sent via the established service flow.

In Step 5, MS responds with DSA-RSP.

In Step 6, EAS Agent sends DSA-ACK to complete the service flow creation for the EAS.

In Step 7, later on, EAS Proxy wants to make changes to the EAS, for example, change the bearer path to carry a new type EAS. EAS Proxy sends Session Update with the new EAS alert type to EAS Agent.

In Step 8, EAS Agent responds with Session Update Rsp.

In Step 9, EAS Agent initiates service flow modification with the new EAS alert type.

In Step 10, MS responds with DSC-RSP.

In Step 11, EAS Agent sends DSC-ACK to complete the service flow modification.

The present invention also proposes network enhancements for macro-diversity. The network behaviour and signaling for EAS are dependant on whether macro-diversity is in use during MBS. When macro-diversity is being used, all BSs send an MBS burst at the same instance of time (simultaneous frames). When macro-diversity is not being used, each BS transmits the MBS packet autonomously, i.e. in an unsynchronized manner with respect to other BSs transmitting the same MBS information.

When Macro-diversity is not enabled, each BS transmits the MBS data packet containing EAS information autonomously without coordinating the transmission with other BSs. In accordance with the present invention, the EAS proxy can determine the required number of retransmissions and interval based on the alert type, operator policy, network load, number of simultaneous active alerts, etc.

When Macro-diversity is enabled, the BSs within the same MBS zone transmit the MBS data packet in a synchronized fashion using; the same DIUC parameters associated with each MBS Burst including FEC Type, Modulation Type, and Repetition Coding; the same mapping of service data units (SDUs) to protocol data unit (PDU) (order of the SDUs and fragments) including Sub Headers; the same mapping of PDUs to bursts; the same order of bursts in the zone/region; and the same MAP construction. The ASN-GW coordinates between multiple BSs which transmit the MBS data burst at the same time. In accordance with the present invention, the EAS proxy determines the required number of retransmissions and interval based on the alert type, operator policy, number of simultaneous active alerts, current network load, etc. Alternatively, each EAS Agent can request the retransmission at specific time, and the EAS Proxy consider it when schedule retransmission.

Figure 4B:
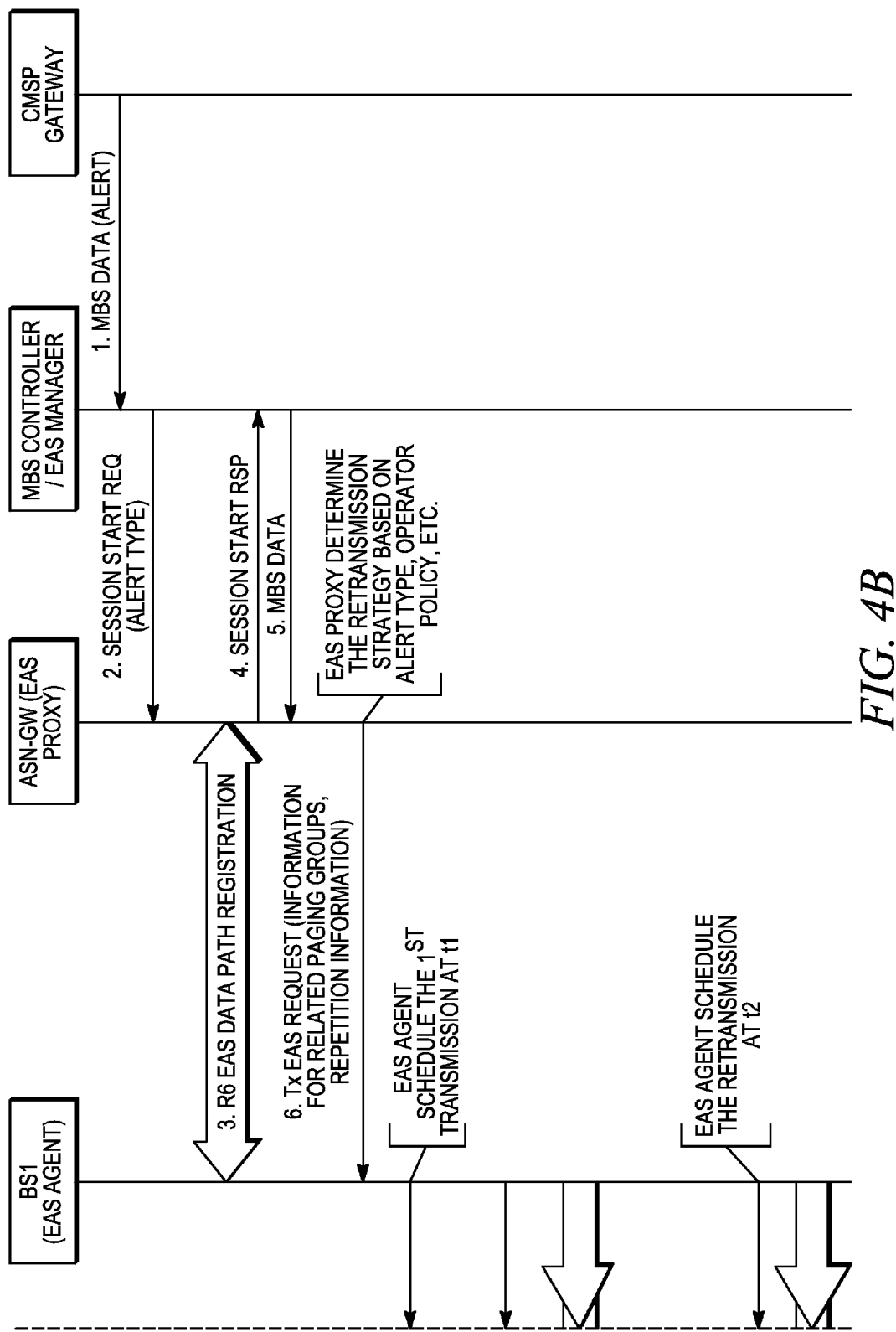
FIG. 4 shows a call flow for an Emergency Alert Service transmission without macro-diversity support, in accordance with the present invention.

FIG. 4 is a call flow that show the air interface and network signaling proposed by the present invention to support EAS when macro-diversity is not supported. It should be noted that while only one MS is shown per paging group or in sleep mode, and only two paging groups are shown, there may be multiple mobiles in sleep mode, and multiple mobiles per paging group and multiple paging groups.

In step 1, the CMSP Gateway (e.g. Content Server/Provider) sends Emergency Alert Information encapsulated in an MBS burst to a WiMAX network.

In step 2, the EAS Manager sends a Session Start Request message with an EAS indication of the alert type, in accordance with the present invention, to the EAS Proxy in the ASN-GW.

In step 3, the EAS Proxy triggers the ASN-GW to initiate a bearer data connection between the ASN-GW and BS with one more EAS Agents which are co-located at one or more BSs.

In step 4, the EAS Proxy triggers the ASN-GW to send a Session Start Response message to the EAS Manager. It should be noted that steps 2-4 are not needed if the bearer path for EAS has already been pre-established, for example, using the procedure described in FIG. 10.

In step 5, upon receipt of the Session Start Response message, the EAS manager triggers the MBS Controller to send an MBS burst containing the EAS alert information for users to the EAS Proxy at the ASN-GW. The alert includes information indicating which geographical areas should receive the alert.

In step 6, in accordance with the present invention, the EAS Proxy determines which Paging Groups should receive the alert, which can be based on the location of the emergency, and triggers the ASN-GW to generate a Tx EAS Request message. The Tx EAS Request message can include the EAS alert information, information for related paging groups to receive the alert, and how many times the EAS alert should be retransmitted over the air to ensure it is received (which can vary depending on EAS priority, currently activated EAS alert, network load, etc.). When the EAS alert is to be sent to all MSs, EAS includes information for all active paging groups. A paging group is considered active when one or more mobile stations belong to this paging group. The EAS proxy sends the MBS burst and burst information to each EAS agent co-located at each BS supporting the corresponding paging groups. The information for each paging group includes PAGING_CYCLE, PAGING OFFSET, PAGING_INTERVAL_LENGTH and Paging Group ID.

In steps 7 and 8, based on the received paging group information and in accordance with the present invention, the EAS agent triggers its corresponding BS to send a DL-MAP message containing the Alert Announcement IE pointing to a future common listening frame, i.e. EAS frame that will be broadcast at time t1. In this example, it has been determined that EAS group 1 contains each idle MS in the paging group 3 and sleeping MS2 will wake up in order to receive the EAS alert notification at time t1, and include these inactive MSs in EAS group 1. Note this figure shows a limited number of MSs. In reality, many MSs from many paging groups capable of waking up for EAS Alert notification at Ti will receive the EAS Announcement for t1, therefore there will be a n:1 ratio between paging groups to EAS groups. Each EAS group may also include mobiles in sleep mode. Therefore, the EAS agent triggers its corresponding BS to send a DL-MAP message containing the Alert Announcement IE pointing to the future common listening frame, i.e. EAS frame which will be broadcasted at t1 to EAS group 1, which contains the inactive MSs (i.e., MS2 and MSs belong to paging group 3). The DL-MAP message also includes an indication of the number of times the EAS alert will be re-transmitted.

In step 9, in accordance with the present invention, each inactive MS in EAS group 1 (i.e. sleeping MS2 and idle MSs belong to paging group 3) will wake up at the EAS frame indicated in the Alert Announcement previously sent in the DL-MAP message in time in order to receive the EAS alert notification at time t1 from the network. Each EAS Agent triggers its corresponding BS to send the EAS alert over the service flow created for EAS. The service flow for EAS can be created/modified as described in FIG. 10.

In step 10, based on the received paging group information and in accordance with the present invention, the EAS agent triggers its corresponding BS to send a DL-MAP message containing the Alert Announcement IE pointing to another future common listening frame, i.e. EAS frame that will be broadcast at time t2. In this example, it has been determined that MSs belong to paging group 2 would not have waken up before time t1 but will wake up in time in order to receive the EAS alert notification at time t2. Thus, inactive MSs in paging group 2 will be organized in EAS group 2. Therefore, the EAS agent triggers its corresponding BS to send a DL-MAP message containing the Alert Announcement IE pointing to the future common listening frame, i.e. EAS frame at t2 to MSs in EAS group 2, i.e. inactive MSs belong to paging group 2. The DL-MAP message may also include an indication of the number of times the EAS alert will be re-transmitted.

In step 11, in accordance with the present invention, each MS in EAS group 2, i.e. inactive MS in paging group 2 will wake up at the EAS frame indicated in the Alert Announcement previously sent in the DL-MAP message in time in order to receive the EAS alert notification at time t2. Each EAS Agent triggers its corresponding BS to send the EAS alert over the service flow created for EAS. The service flow can be created/modified as described in FIG. 10.

In steps 9 and 11, each BS sends an MBS burst at the EAS frame indicated in the Alert Announcement previously sent in the DL-MAP message for the associated MSs. All MSs belonging to the paging groups or sleep/idle groups receive the Alert Announcement to 'wake up' at the corresponding EAS frame to receive the EAS alert. Upon successful receipt of the EAS MBS burst, an MS receiving a subsequent DL-MAP message with Alert Announcement for the EAS alert information ignores the subsequent correspond EAS bursts as indicated by the remaining re-transmission indication.

Figures 5, 5A:
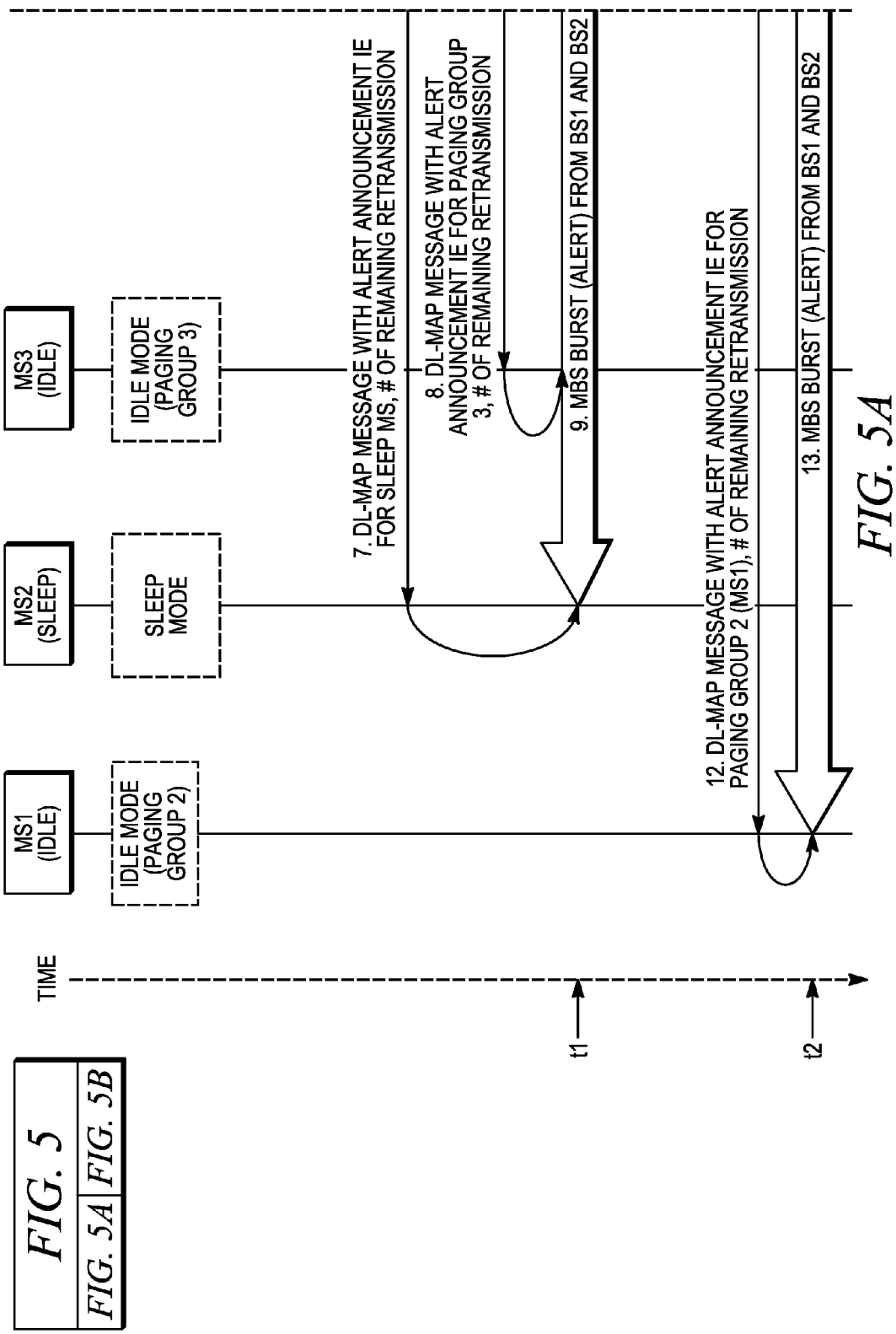
FIG. 5 shows a call flow for an Emergency Alert Service transmission with macro-diversity support, in accordance with the present invention.
Figure 5B:
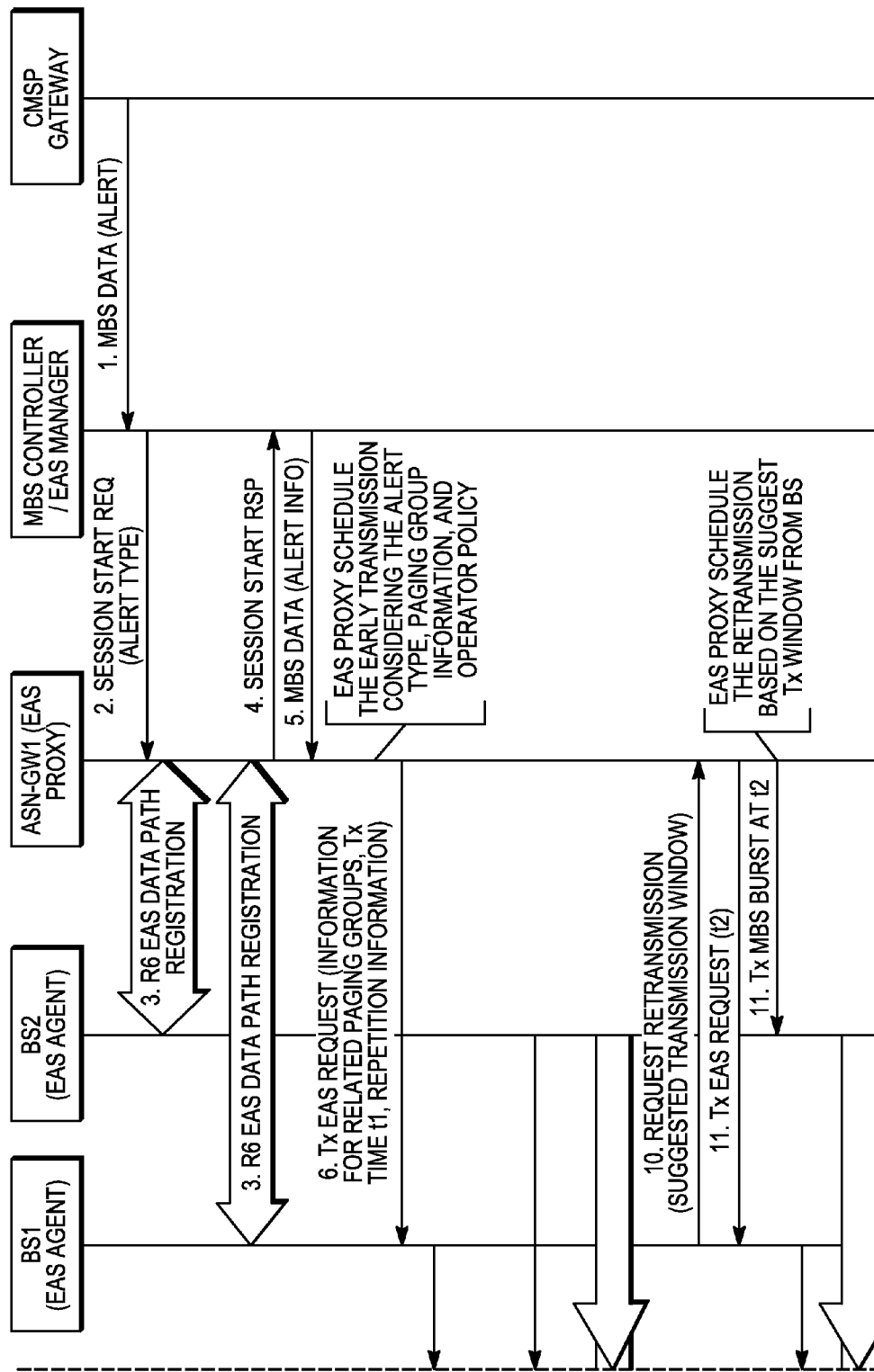

FIG. 5 is a call flow that show the air interface and network signaling proposed by the present invention to support EAS with macro-diversity support. It should be noted that while only one MS is shown per paging group or sleep mode and only two paging groups are shown in this example, there may be multiple mobiles in sleep mode, multiple mobiles per paging group and multiple paging groups.

In step 1, the CMSP Gateway (e.g. Content Server/Provider) sends Emergency Alert Information encapsulated in an MBS burst.

In step 2, the EAS Manager sends a Session Start Request message with an EAS indication of the alert type, in accordance with the present invention, to the EAS Proxy in the ASN-GW.

In step 3, the EAS Proxy triggers the ASN-GW to initiate a bearer data connection between the ASN-GW and BS with EAS Agents which are co-located at one or more BSs.

In step 4, the EAS Proxy triggers the ASN-GW to send a Session Start Response message to the EAS Manager. It should be noted that steps 2-4 are not needed if the bearer path for EAS has already been pre-established, for example, using the procedure described in FIG. 10.

In step 5, upon receipt of the Session Start Response message, the EAS manager triggers the MBS Controller to send an MBS burst containing the EAS alert information for users to the EAS Proxy at the ASN-GW. The alert includes information indicating which geographical areas should receive the alert.

In step 6, in accordance with the present invention, the EAS Proxy determines which Paging Groups should receive the alert, which can be based on the location of the emergency, and triggers the ASN-GW to generate a Tx EAS Request message. The Tx EAS Request message can include the EAS alert information, information for related paging groups to receive the alert, and the transmit time of the burst for macro-diversity support across multiple BSs. EAS Proxy may also decide and schedule the retransmissions, and include the information for how many times the EAS alert should be retransmitted over the air to ensure it is received (which can vary depending on EAS priority), and the list of transmission time/interval. When the EAS alert is to be sent to all MSs, EAS includes information for all active paging groups. A paging group is considered active when one or more mobile stations belong to this paging group. The EAS proxy sends the MBS burst and burst information to each EAS agent co-located at each BS supporting the corresponding paging groups. The information for each paging group includes PAGING_CYCLE, PAGING OFFSET, PAGING_INTERVAL_LENGTH and Paging Group ID.

In step 7 and 8, based on the received paging group information and in accordance with the present invention, the EAS agent triggers its corresponding BS to send a DL-MAP message containing the Alert Announcement IE pointing to a future common listening frame, i.e. EAS frame that will be broadcast at time t1. In this example, it has been determined that each idle MS in the paging group 3 and sleeping MS2 will wake up at the EAS frame indicated in the Alert Announcement previously sent in the DL-MAP message in time in order to receive the EAS alert notification at time t1, and include these inactive MSs in EAS group 1. However, MSs belong to paging group 2 will not wake-up until after time t1. Therefore, the EAS agent triggers its corresponding BS to send a DL-MAP message containing the Alert Announcement IE pointing to the future common listening frame, i.e. EAS frame at t1 to EAS group 1, which contains the inactive MSs (i.e., MS2 and MSs belong to paging group 3). The DL-MAP message may also include an indication of the number of times the EAS alert will be re-transmitted.

In step 9, in accordance with the present invention, each inactive MS in EAS group 1 (i.e. sleeping MS2 and MSs belong to idle paging group 3) will wake up at the EAS frame indicated in the Alert Announcement previously sent in the DL-MAP message in time in order to receive the EAS alert notification at time t1. Each EAS Agent triggers it corresponding BS to send the EAS alert over the service flow for EAS at the same time/frame indicated in the Alert Announcement previously sent in the DL-MAP message for the associated MSs, therefore each MS receives the information from multiple BSs. The service flow for EAS can be created/modified as described in FIG. 10.

Upon successful receipt of the EAS MBS burst, MS receiving subsequent DL-MAP message for the EAS alert information ignores the subsequent correspond EAS bursts as indicated by the remaining re-transmission indication.

In step 10, when the EAS agent finds that some MS may not be able to receive the EAS notification, EAS agent sends a Request retransmission message to EAS proxy, in accordance with the present invention. This message contains the recommended transmission window.

In step 11, based on the recommendation from the EAS agent, the EAS proxy schedules a retransmission at time t2 and sends a Tx EAS Request message which includes the EAS alert information, information for related paging groups to receive the alert, and the transmit time of the burst for macro-diversity support across multiple BSs. EAS Proxy may also decide and schedule the retransmissions, and includes the information for how many times the EAS alert should be retransmitted over the air to ensure it is received (may vary depending on EAS priority), and the list of transmission time/interval. The EAS Proxy sends the MBS burst and burst info to each EAS agent co-located at each BS supporting the corresponding paging groups. The information for each paging group includes PAGING_CYCLE, PAGING OFFSET, PAGING_INTERVAL_LENGTH and Paging Group ID.

In step 12, based on the received paging group information and in accordance with the present invention, the EAS agent triggers its corresponding BS to send a DL-MAP message containing the Alert Announcement IE pointing to another future common listening frame, EAS frame at time t2. In this example, MSs in EAS group 2, i.e. MSs in paging group 2 wake up at the EAS frame indicated in the Alert Announcement previously sent in the DL-MAP message in time in order to receive the EAS alert notification at time t2. Each EAS Agent triggers it corresponding BS to send the EAS alert at the same time/frame, therefore each MS receives the information from multiple BSs.

In step 13, in accordance with the present invention, each inactive MS (i.e. sleeping MS and MSs belong to idle paging group 2) will wake up at the EAS frame indicated in the Alert Announcement previously sent in the DL-MAP message in time in order to receive the EAS alert notification at time t2. Each EAS Agent triggers its corresponding BS to send the EAS alert over the service flow for EAS at the same time/frame indicated in the Alert Announcement previously sent in the DL-MAP message for the associated MSs, therefore each MS receives the information from multiple BSs. The service flow for EAS can be created/modified as described in FIG. 10.

In steps 9 and 13, upon successful receipt of the EAS notification, an MS receiving a subsequent DL-MAP message with Alert Announcement for the EAS alert information ignores the subsequent correspond EAS bursts as indicated by the remaining re-transmission indication.

FIG. 6 shows a table of an Alert Announcement Information Elements (ILEs) in accordance with the present invention. An 8-bit parameter is used as an EAS Indication, where Bit #0-4 describes the type or class of alert message. For example, if bit #0 is set to 1, it indicates that Presidential Alert will be transmitted using this service flow. If bit #1 is set to 1, it indicates that Extreme Threat alert will be transmitted using this service flow. If bit #2 is set to 1, it indicates that Severe Threat alert will be transmitted using this service flow. If bit #3 is set to 1, it indicates that Amber alert will be transmitted using this service flow. If bit #4 is set to 1, it indicates that EAS test will be transmitted using this service flow. Other classifications and numbering can be envisioned. Bit #5-7 represent a combination value of Urgency/Severity/Certainty.

Another 8-bit parameter is used to describe the number of remaining retransmissions. Another 8-bit parameter EAS_Transmission_Frame is used to describe when the EAS notification will be transmitted.

Figure 7:
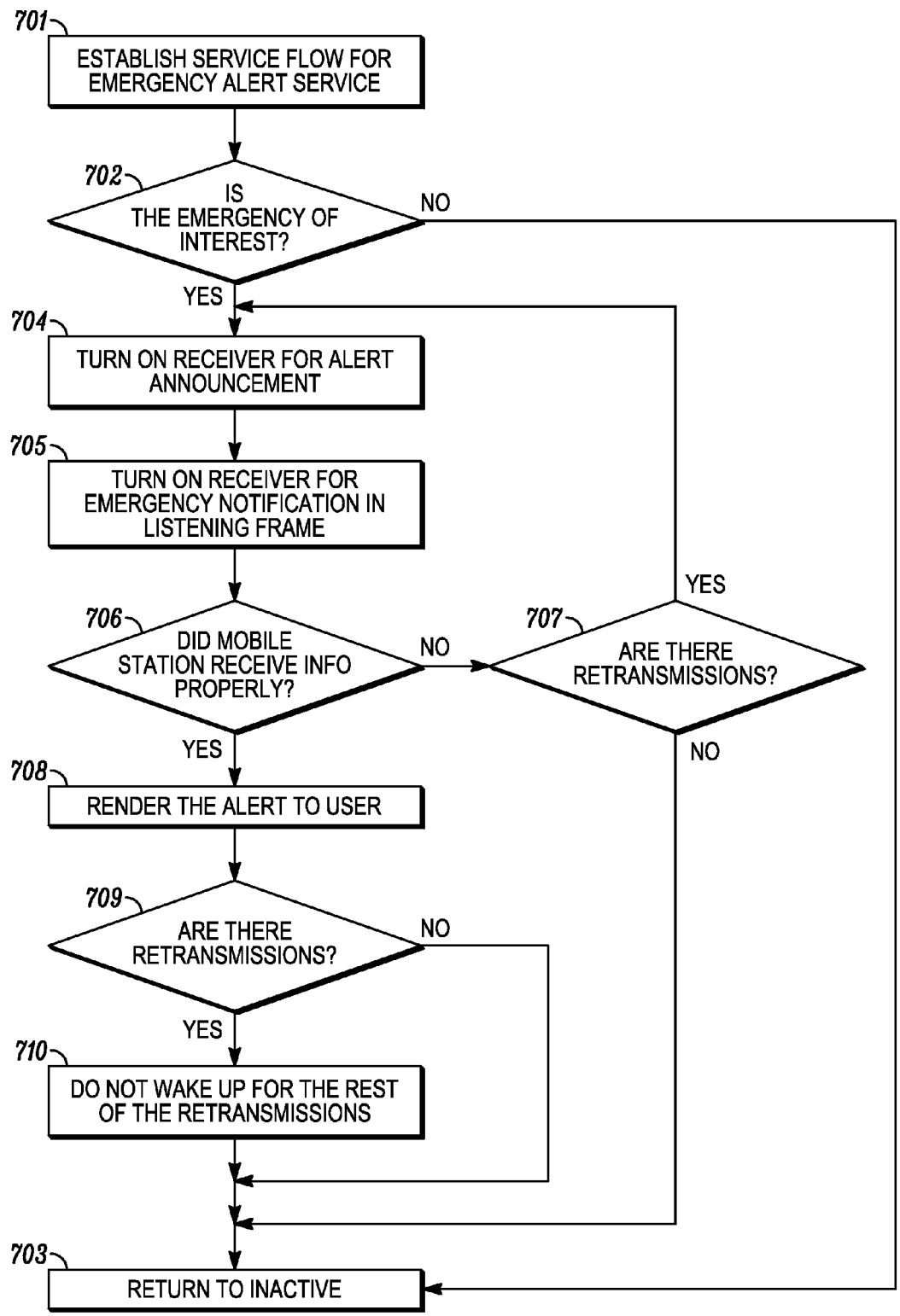
FIG. 7 shows a flow chart illustrating an Emergency Alert reception method, in accordance with the present invention.

FIG. 7 shows a flowchart that illustrates a method for receiving emergency alert information in an inactive mobile station in a wireless communication system. The method includes a first step 701 of establishing the service flow for Emergency Alert Service. The service flow is tagged with the EAS class.

A next step 702 includes determining if the emergency alert is of interest to a user. If so, the process continues at the next step (step 704). Otherwise, the mobile station returns to step 703 to remain inactive and the process ends.

A next step 704 includes turning on the receiver at the first time (wake-up period) to receive the Alert Announcement in DL-MAP message before the first emergency alert transmission opportunity.

A next step 705 includes turning on the receiver at the common emergency alert listening frame, which is pointed by the Alert Announcement, to receive the alert notification.

A next step 706 including determining whether mobile station receive the alert properly. If the mobile station receives the alert properly, the mobile station renders the alert to the user at step 708. Otherwise, it goes to step 707.

A next step 707 includes determining whether the Alert Announcement indicates retransmission. If there is no retransmission, the process ends at step 703. Otherwise, the mobile station returns to step 704 to prepare the reception for the retransmitted alerts.

A next step 709 includes determining whether the Alert Announcement indicates retransmission of the alert. If so, the mobile station goes to step 710 including remaining inactive and ignore the rest retransmissions. In other words, if a number of retransmissions are indicated in the message, after proper reception of the emergency alert information, the mobile station will not wake up during the remaining number of retransmissions of the emergency alert information in retransmitted listening frames. Then the mobile station goes to step 703 and the process ends. Otherwise, the mobile station goes to step 704 and process ends.

Figure 8:
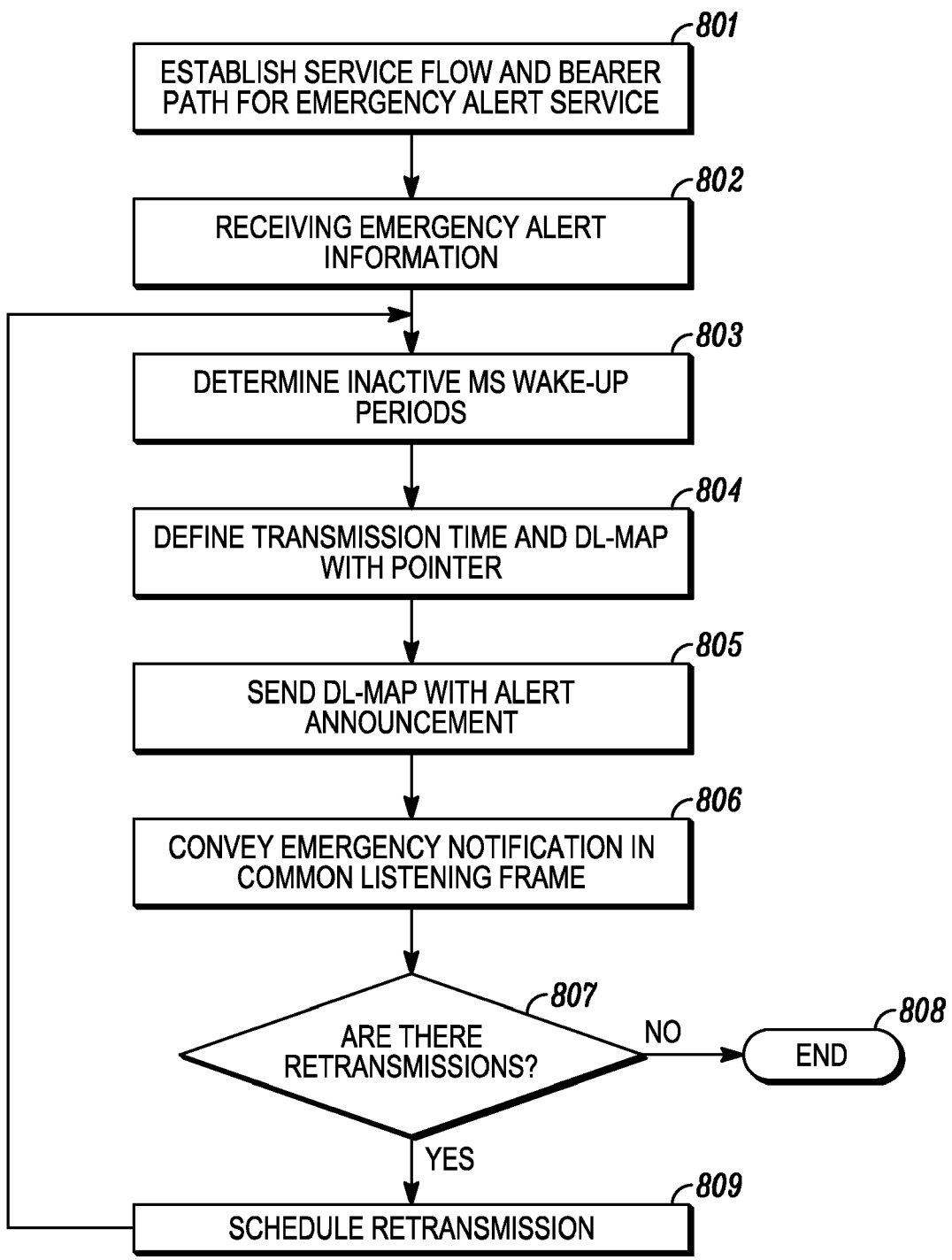
FIG. 8 shows a flow chart illustrating an Emergency Alert transmission method, in accordance with the present invention.

FIG. 8 shows a flowchart that illustrates a method for sending emergency alert information to inactive mobile stations in a wireless communication system. The method includes a first step 801 of establishing the service flow and bearer path for Emergency Alert Service. The service flow and bearer path is tagged with the EAS class.

A next step 802 of receiving, by an access network, emergency alert notification for mobile stations. The emergency alert notification can be limited to those mobile stations within a particular geographical area, such as an area impacted by the emergency.

A next step 803 includes determining if any of the mobile stations are inactive and if so when the inactive mobile stations will wake-up. In practice, this step includes an EAS Proxy (ASN-GW) sending all active Paging Group information to an EAS Agent (BS), which includes R4/R6 message changes. This step can include determining the wake-up period for two or more inactive mobile stations subscribed to the same EAS group, which in itself can consist of two or more different paging groups. In addition, multiple EAS groups can be defined each with different listening frames.

A next step 804 includes defining a transmission time, a retransmission strategy, and an air interface (i.e. DL-MAP) message that includes a pointer to an unscheduled common emergency alert listening frame to be broadcast at a first time after the inactive mobile stations wakes-up during its listening slot. The common emergency listening frame where the emergency notification is sent is selected in a future time after selected MSs in selected paging groups can successfully receive the alert announcement. In this step, the retransmission strategy includes defining a number of retransmissions of the emergency listening frame. The retransmission strategy can be initiated by the EAS agent that can request retransmission to an ASN-GW with recommended transmission window, which includes R4/R6 message changes. Preferably, the DL-MAP message includes an Alert Announcement information element that define the emergency alert indication and optionally the number of retransmissions for the same emergency alert. The DL-MAP message indicates to the inactive mobile station when they should wake-up to listen to the common emergency listening frame and any optional retransmissions of the same emergency notification. Optionally, in step 804 an R4/R6 message can include the determination of transmission time of the emergency listening frame for macro-diversity support across multiple BSs. In particular, an ASN-GW can determine the transmission time based on at least one of the group of a current alert type, a network load, an operator policy, and a recommendation from a BS. This subsequently includes the ASN-GW transmitting a Tx EAS Request message to the BS, wherein the Tx EAS Request message includes paging information for related active paging groups, a transmission time, and retransmission information. The paging information includes PAGING_CYCLE, PAGING_OFFSET, PAGING_INTERVAL_LENGTH and Paging Group ID. The retransmission information includes a number of retransmissions of the emergency alert and a list of transmission time or interval.

A next step 805 includes sending the air interface (i.e. DL-MAP) message that includes a pointer to an unscheduled common emergency alert listening frame to inactive mobiles that wake up during a wake up period before the first emergency alert transmission time opportunity. The message informs the mobile station when to wake up again during the common emergency alert listening frame to receive EAS.

A next step 806 includes conveying emergency alert instructions in the common emergency alert listening frame to the mobile stations that received the alert pointer information and have woken up again in the common emergency alert listening frame. Furthermore, step 806 includes synchronized transmission information, thus all base stations transmit the emergency alert simultaneously when macro-diversity is enabled.

A next step 807 includes determining whether retransmission is needed. If not needed, it goes to step 808 and process ends. Otherwise, the network schedules the retransmission in step 809, and goes to step 803 for retransmission.

It will be understood that the terms and expressions used herein have the ordinary meaning as is accorded to such terms and expressions by persons skilled in the field of the invention as set forth above except where specific meanings have otherwise been set forth herein.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A mobile station operable to receive emergency alert information, the mobile station comprising:

a receiver operable to receive a message that includes instructions that point to a common emergency alert listening frame, wherein the message is sent from a network entity that receives emergency alert information for the mobile station and determines the wake up period when an inactive mobile station will wake up, wherein during the wake up period the mobile station will wake up and receive the instructions, whereupon the mobile station then will wake up in the common emergency listening frame to receive the emergency alert information;

wherein if a number of retransmissions are indicated in the message, after proper reception of the emergency alert information, the mobile station will not wake up during the remaining number of retransmissions of the emergency alert information in retransmitted listening frames.

2. The mobile station of claim 1 wherein the instructions include at least of the group of: a pointer to the listening frame, the type of emergency alert, and the number of retransmissions.

3. The mobile station of claim 1 wherein if the emergency alert information is not of interest to a user of the mobile station, the mobile station will not wake up during the common emergency listening frame.

* * * * *